(12) United States Patent
Jiang et al.

(10) Patent No.: US 9,541,115 B2
(45) Date of Patent: Jan. 10, 2017

(54) CLOSED RIVET PLUG

(71) Applicant: HUBEI BOSHILONG TECHNOLOGY CO., LTD., Zhongxiang, Hubei (CN)

(72) Inventors: Dasheng Jiang, Hubei (CN); Zhiyi Cheng, Hubei (CN); Jun Liu, Hubei (CN)

(73) Assignee: HUBEI BOSHILONG TECHNOLOGY CO., LTD. (CN)

( * ) Notice: Subject to any disclaimer, the term of this patent is extended or adjusted under 35 U.S.C. 154(b) by 189 days.

(21) Appl. No.: 14/558,737

(22) Filed: Dec. 3, 2014

(65) Prior Publication Data

US 2016/0069370 A1    Mar. 10, 2016

(30) Foreign Application Priority Data

Sep. 5, 2014    (CN) .......................... 2014 1 0450612

(51) Int. Cl.
*F16B 19/10*    (2006.01)
*F16L 55/11*    (2006.01)

(52) U.S. Cl.
CPC ........ *F16B 19/1054* (2013.01); *F02F 2200/00* (2013.01); *F16L 55/1141* (2013.01)

(58) Field of Classification Search
CPC . F16B 19/1054; F16B 19/1045; F16B 13/065; F16L 55/11; F16L 55/1133
USPC .............................................. 411/69; 138/89
See application file for complete search history.

(56) References Cited

U.S. PATENT DOCUMENTS

| | | | | |
|---|---|---|---|---|
| 2,779,955 A * | 2/1957 | Curtis | .................. | B21K 1/60 29/517 |
| 3,438,301 A * | 4/1969 | Mattioli | ................ | B21J 15/043 411/34 |
| 3,451,583 A * | 6/1969 | Lee | .......................... | F16J 13/02 138/89 |
| 3,525,365 A * | 8/1970 | Boyle | ...................... | F16B 3/06 138/89 |
| 3,825,146 A * | 7/1974 | Hirmann | ................ | B65D 39/12 138/89 |
| 5,078,294 A * | 1/1992 | Staubli | .................. | F16B 13/065 220/233 |
| 6,966,342 B2 * | 11/2005 | Denham | ................ | F16L 55/13 138/89 |
| 8,496,419 B2 * | 7/2013 | Frank | .................... | F16B 19/086 29/524.1 |
| 2015/0192161 A1* | 7/2015 | Makino | ............... | F16B 19/1054 411/43 |

* cited by examiner

*Primary Examiner* — Flemming Saether
(74) *Attorney, Agent, or Firm* — Wiersch IP Law

(57) ABSTRACT

The present invention discloses a closed rivet plug. The closed rivet plug is mainly comprised of a rivet core and a rivet housing; the rivet housing is hollow and cylindrical and has one closed end; the closed end of the cylindrical rivet housing is provided with an inward recessed arc; the rivet core consists of a rivet rod and a rivet head; the rivet core closely fits the hollow space of the cylindrical rivet housing through the rivet head; the top of the rivet head of the rivet core is provided with a pit matched with the recessed arc at the closed end of the cylindrical housing; and the rivet head of the rivet core is entirely shaped as a truncated cone. The invention has advantages of avoiding falling off and completely preventing safety hazards caused by leakage from the processed holes, together with firm and reliable plugging, simple structure, low manufacturing cost, quick and convenient plugging.

4 Claims, 1 Drawing Sheet

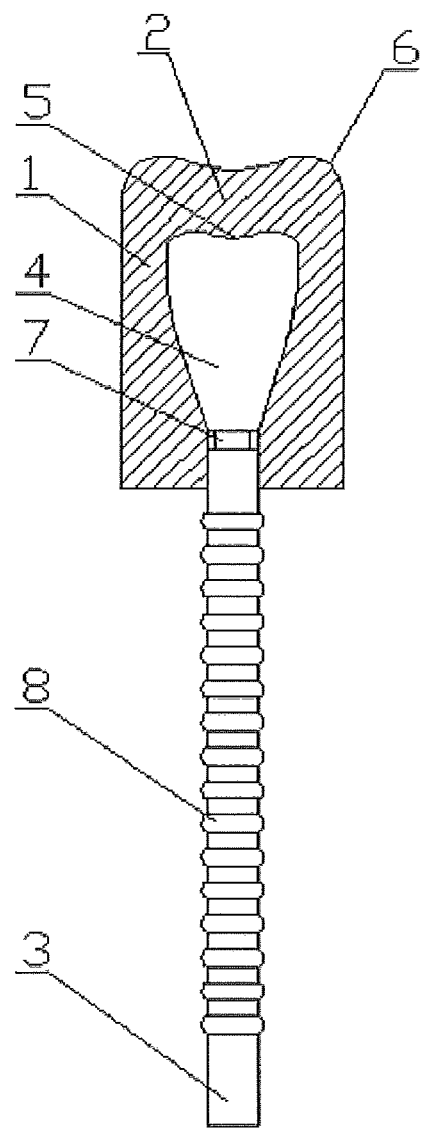

CLOSED RIVET PLUG

FIELD

The present invention relates to the technical field of rivet plugs, and more specifically, to the technical field of rivet plugs for blockage.

BACKGROUND

To meet the processing demand of processing, measurement and assembly, holes additional formed on the work pieces are usually called as processed holes. Some of those processed holes need plugging in the end. For example, when processed holes that are formed on crankshafts, pistons, air cylinders and engine cylinders need plugging, high requirements are imposed on the plugs. At present, on such special occasions, ball expansion plugs, thread sealing plugs and stud sealing plugs are usually used for plugging. Those plugs still may fall off at constant high temperature, high pressure or when affected by strong vibration. Leakage from the plugged processed holes will bring about severe safety hazards, and the fallen plugs may cause immeasurable loss to the plugged main body.

SUMMARY

The object of the present invention is to provide a closed rivet plug which plugs firmly and reliably, has a simple structure and low manufacturing cost, is easy and convenient to plug and can completely avoid accidental falling to overcome the above-mentioned defects.

In order to solve the above technical problems, the present invention employs the following technical solution:

A closed rivet plug is mainly comprised of a rivet core and a rivet housing; the rivet housing is hollow and cylindrical and has one closed end; the closed end of the cylindrical rivet housing is provided with an inward recessed arc; the rivet core consists of a rivet rod and a rivet head; the rivet core closely fits the hollow space of the cylindrical rivet housing through the rivet head; the top of the rivet head of the rivet core is provided with a pit matched with the recessed arc at the closed end of the cylindrical housing; and the rivet head of the rivet core is entirely shaped as a truncated cone.

Circular arc-shaped chamfers are disposed on the circumference of the closed end of the rivet housing.

A notch is located at the junction of the rivet rod and rivet head of the rivet core.

The rivet rod of the rivet core is provided with anti-slip ring patterns.

The inner surface of the hollow space of the cylindrical rivet housing matches with and is in close fit with the outer surface of the rivet head of the rivet core.

The present invention using the above technical solution achieves the following beneficial effects: Firm and reliable plugging, simple structure, and low manufacturing cost. The processed holes are plugged in a rivet plugging method. The rivet plug is conveniently used in combination with a special rivet gun. The plugging process is quick and convenient. During plugging, the upper part of the rivet housing will generate certain deformation outward on the out sides when the rivet head of the rivet core is started to be extracted out from the rivet housing because the closed end of the rivet housing is provided with the inward recessed arc and the circular arc-shaped chamfers are disposed on the circumference of the closed end of the rivet housing. This deformation applies to an extruding and sealing effect on the inner wall of the processed hole. When the rivet head of the rivet core is completely extracted out of the rivet housing, the lower part of the rivet housing will generate certain deformation by the effect of the conical surface of the rivet head. This deformation also applies an extruding and sealing effect on the inner wall of the processed hole, and then rivet housing can be more closely sealed and plugged in the processed hole. In addition, one end of the rivet housing is closed, so the rivet housing and the rivet head of the rivet core will be plugged in the processed hole together after rivet plugging is complete, thus presenting a completely sealed and closed state. The plugging form compared with the current plugging method is more firm, avoids falling and completely prevents the safety hazards caused by leakage of the processed hole.

BRIEF DESCRIPTION OF THE DRAWINGS

The present invention will be further illustrated below in conjunction with the accompanying drawings and embodiments.

FIG. 1 is a structural view of the closed rivet plug.

DETAILED DESCRIPTION

As shown in FIG. 1, a closed rivet plug is mainly comprised of a rivet core and a rivet housing 1. The rivet housing 1 is cylindrical and has one closed end; the closed end of the cylindrical rivet housing 1 is provided with an inwardly directed dome shape having a convex surface 2; the rivet core consists of a rivet rod 3 and a rivet head 4; the rivet core closely fits the inner space of the cylindrical rivet housing 1 through its rivet head 4; an end of the rivet head 4 of the rivet core is provided with a concave surface 5 matched with the convex surface 2 at the closed end of the cylindrical housing 1; and the rivet head 4 of the rivet core is substantially shaped as a truncated cone. Circular arc-shaped chamfers 6 are disposed on the circumference of the closed end of the rivet housing 1. A notch 7 is located at the junction of the rivet rod 3 and rivet head 4 of the rivet core. To facilitate the working of the rivet plug, the rivet rod 3 of the rivet core is provided with anti-slip ring patterns 8. The inner surface of the hollow space of the cylindrical rivet housing 1 matches with and is in close fit with the outer surface of the rivet head 4 of the rivet core.

What is claimed is:

1. A closed rivet plug, comprising a rivet core and a rivet housing, wherein,
   the rivet housing is cylindrical and has one closed end, the closed end of the cylindrical rivet housing is provided with an inwardly directed dome shape having a convex surface, the rivet core consists of a rivet rod and a rivet head, the rivet core closely fits an inner space of the cylindrical rivet housing through its rivet head, an end of the rivet head of the rivet core is provided with a concave surface matched with the convex surface at the closed end of the cylindrical housing, and the rivet head of the rivet core is substantially shaped as a truncated cone.

2. The closed rivet plug according to claim 1, wherein, circular arc shaped chamfers are disposed on the circumference of the closed end of the rivet housing.

3. The closed rivet plug according to claim 1, wherein, a notch is located at the junction of the rivet rod and rivet head of the rivet core.

4. The closed rivet plug according to claim 1, wherein, the rivet rod of the rivet core is provided with anti-slip ring patterns.

* * * * *